(12) United States Patent
Kovacs et al.

(10) Patent No.: US 7,583,936 B2
(45) Date of Patent: Sep. 1, 2009

(54) CIRCUIT WITH REDUCED INSERTION LOSS AND COMPONENT COMPRISING ONE SUCH CIRCUIT

(75) Inventors: Günter Kovacs, Munich (DE); Veit Meister, Kagel (DE); Florian Schnirch, München (DE); Martin Bünner, Munich (DE)

(73) Assignee: EPCOS AG, Munich (DE)

( * ) Notice: Subject to any disclaimer, the term of this patent is extended or adjusted under 35 U.S.C. 154(b) by 37 days.

(21) Appl. No.: 10/570,364

(22) PCT Filed: Aug. 25, 2004

(86) PCT No.: PCT/EP2004/009502

§ 371 (c)(1),
(2), (4) Date: Sep. 29, 2006

(87) PCT Pub. No.: WO2005/053172

PCT Pub. Date: Jun. 9, 2005

(65) Prior Publication Data

US 2007/0191055 A1    Aug. 16, 2007

(30) Foreign Application Priority Data

Nov. 11, 2003  (DE) ............... 103 52 642

(51) Int. Cl.
*H04B 1/44* (2006.01)
(52) U.S. Cl. ............. 455/78; 455/552.1; 455/339; 455/306; 455/199.1; 455/132; 455/307; 333/133; 333/193

(58) Field of Classification Search ............ 455/307, 455/302, 76, 118, 83, 78, 552.1, 132, 339, 455/199.1, 313, 323
See application file for complete search history.

(56) References Cited

U.S. PATENT DOCUMENTS

| | | | | |
|---|---|---|---|---|
| 5,170,493 A | * | 12/1992 | Roth | 455/82 |
| 5,517,687 A | * | 5/1996 | Niehenke et al. | 455/325 |
| 5,815,804 A | * | 9/1998 | Newell et al. | 455/78 |
| 6,023,205 A | * | 2/2000 | Huang et al. | 333/202 |
| 6,115,592 A | * | 9/2000 | Ueda et al. | 455/307 |
| 6,134,427 A | * | 10/2000 | Hughes | 455/269 |

(Continued)

FOREIGN PATENT DOCUMENTS

EP   0729239   8/1996

(Continued)

OTHER PUBLICATIONS

Translation of Written Opinion for Application No. PCT/EP2004/009502.

(Continued)

*Primary Examiner*—Marceau Milord
(74) *Attorney, Agent, or Firm*—Fish & Richardson P.C.

(57) ABSTRACT

An electrical circuit has at least two parallel signal paths connected to one another on the antenna side and for which a band reject filter corresponding to the transmission range is implemented in a second signal path for frequency-selective improvement of insertion loss in the transmission range of a first signal path. With a band reject filter, the signal is reflected to the junction of the parallel signal paths arising from the second signal path and thus is rerouted to the first signal path.

24 Claims, 6 Drawing Sheets

U.S. PATENT DOCUMENTS

| | | | | |
|---|---|---|---|---|
| 6,242,843 | B1 * | 6/2001 | Pohjonen et al. | 310/313 R |
| 6,348,830 | B1 * | 2/2002 | Rebeiz et al. | 327/355 |
| 6,397,051 | B1 * | 5/2002 | Abbasi et al. | 455/295 |
| 6,584,304 | B1 * | 6/2003 | Thomsen et al. | 455/188.1 |
| 6,639,491 | B2 * | 10/2003 | Toncich | 333/125 |
| 6,850,748 | B2 * | 2/2005 | Song et al. | 455/302 |
| 6,862,441 | B2 * | 3/2005 | Ella | 455/307 |
| 6,917,328 | B2 * | 7/2005 | Rabinowitz et al. | 342/357.06 |
| 6,922,117 | B2 * | 7/2005 | Karlquist | 333/132 |
| 7,003,312 | B2 * | 2/2006 | Kemmochi et al. | 455/552.1 |
| 7,049,906 | B2 * | 5/2006 | Wilcox | 333/126 |
| 7,076,216 | B2 * | 7/2006 | Hayashi | 455/78 |
| 2001/0052830 | A1 * | 12/2001 | Noguchi et al. | 333/133 |
| 2004/0248614 | A1 * | 12/2004 | Ella | 455/552.1 |
| 2006/0135071 | A1 * | 6/2006 | Kim | 455/63.1 |

FOREIGN PATENT DOCUMENTS

| | | |
|---|---|---|
| EP | 0964477 | 12/1999 |
| FR | 2 844 651 | 3/2004 |
| GB | 2 280 559 | 2/1995 |
| JP | 392819 | 9/1991 |
| JP | 8237165 | 9/1996 |
| JP | 11355174 | 12/1999 |

OTHER PUBLICATIONS

Ghadaksaz M. "Novel Active RF Tracking Notch Filters for Interference Suppression in HF, VHF, and UHF Frequency Hopping Receivers", MILCOM 91, IEEE, Bd vol. 2, Nov. 4, 1991 p. 956-960.

Written Opinion for PCT/EP2004/009502.

Office Action issued in corresponding Japanese application dated Aug. 22, 2008, 4 pages.

* cited by examiner

US 7,583,936 B2

CIRCUIT WITH REDUCED INSERTION LOSS AND COMPONENT COMPRISING ONE SUCH CIRCUIT

TECHNICAL FIELD

The technology concerns an electrical circuit for use in modern wireless devices having multiple functionalities.

BACKGROUND

In addition to wireless end devices that are used in wireless systems to transmit mobile telecommunications data, for example AMPS (Advanced Mobile Phone System), GSM (Global System Mobile) and PCS (Personal Communication System), end devices are being developed that also fulfill additional functionalities, such as location determination (GPS=Global Positioning System), wireless connection to EDP devices (Bluetooth), or to a local network (WLAN=Wireless Local Area Network).

An aerial switch can switch between various frequency bands in time slots (time division), wherein a common send/receive antenna is connected sequentially with various signal paths. This solution has the disadvantage that the respective signal path is not, at any time, available for data transmission.

With a common antenna, signals that are to be transmitted from various wireless systems can be separated from one another (frequency division) with a diplexer that comprises a low pass filter and a high pass filter. The send or receive signal of the same wireless systems is rerouted, for example, by a duplexer in the corresponding send or receive path.

In the case of an end device having multiple functionalities, each functionality generally is assigned to a specific frequency range for data transmission.

For example, end devices with two antennas are known, wherein one antenna is used to transmit in the PCS band and the other antenna is used to transmit Bluetooth, WLAN or GPS data. The solution using separate antennas has the advantage of especially high suppression of the counter-band and low insertion loss in both transmission ranges, but needs more space and/or costs more.

For example, it is possible to link the two signal paths, each signal path for one wireless system, wherein one signal path is for GPS data transmission with one send/receive antenna via an antenna duplexer that has a low pass filter, a high pass filter and a band pass filter provided for GPS data transmission which switches all signal paths parallel to an antenna. The solution using one antenna saves space, but incurs high insertion loss because one part of the wanted signal gets lost by the antenna-side branch of the signal path.

A diplexer on the antenna side can be used to separate, for example, AMPS and PCS signals for a multiband end device with GPS functionality, wherein a GPS signal path in accordance with the diplexer is rerouted, for example, with a band pass filter or an additional output-side diplexer.

All previously known end devices having an antenna and several functionalities, i.e., with multiple signal paths each attached to an antenna connection and being parallel to one another, are characterized by high insertion loss.

The task is therefore to provide a front-end circuit that can be operated with only one antenna that, first, separates signals in the case of multiple functionalities and, second, has low insertion loss in the transmission range of at least one signal path.

SUMMARY

In one aspect, a circuit comprises a first signal path with a band pass filter for a transmission range is arranged, and a second signal path with a band reject filter having a cut-off region. The circuit can be connected directly or via an additional circuit with an antenna connection or an antenna. The first and second signal paths are parallel to one another and are connected to one another on the antenna side. The transmission range overlaps, at least partially, with the cut-off region, whereby a low insertion loss of the wanted signal is obtained where the transmission range and the cut-off region overlap, and interference from the second signal path in the frequency region of the wanted signal is suppressed on the antenna side.

A wanted signal means a signal to be transmitted to the first signal path and a signal to be extracted from the second signal path.

The signal paths are separated from each other in the frequency region and are available to transmit data. Low insertion loss and correspondingly high sensitivity are achieved in the first signal path by rerouting the wanted signal to the signal path/branching site in this path with a band reject filter in the second signal path.

A band reject filter in the parallel second signal path can be used for all frequencies, with the exception of the cut-off region for data transmission. This simplifies switching and reduces logistics costs because reliable components and component groups can be expanded very rapidly by added functionalities.

In one aspect, a first signal path, which is designed for a specific functionality or for a wanted signal related to this functionality, can be connected, without significant signal loss, directly to an antenna or to an output of an antenna duplexer. This signal path is parallel to an additional signal path, wherein the rerouted wanted signal is made available for further signal processing on the output side.

It is therefore possible to implement a component that requires little space at low cost.

The circuit can be switched with an antenna with an antenna duplexer that comprises a band pass filter and a blocking band reject filter in the transmission range of the band pass filter. The blocking band reject filter is an extractor filter.

In the extractor filter, the impedance of the band reject filter and the band pass filter is adjusted so that (1) the antenna-side impedance of the band pass filter is matched to the antenna impedance and (2) the antenna-side impedance of the band reject filter is high in the transmission range of the first signal path. In contrast to that, (1) the antenna-side impedance of the band reject filter is always matched to the antenna impedance and (2) the antenna-side impedance of the band pass filter is high for all frequencies, except for the cut-off region.

Specifically, an extractor filter integrated into a single, modular, component is used to improve the adjustment of antenna-side impedance of a front-end circuit compared to the known front-end circuits.

With an intentional suppression of a frequency band corresponding to the wanted signal that is to be transmitted through the first signal path, it is possible to achieve high suppression of unwanted signals associated with the wanted signal; for example, high suppression of the noise from a power amplifier used to boost the wanted signal. This effect can be compared with the suppression of the counter-band in each band of a duplexer. However, due to the band reject filter, this effect is achieved reliably and at low cost.

In one embodiment, the signal related to a specific functionality is received directly at the antenna connection via a band pass filter, wherein the first and second branches are connected to the antenna connection and wherein the band pass filter is arranged in the first branch. An electro-acoustical resonator, a parallel resonance circuit comprised of multiple discrete elements and/or strip lines, or a discrete band reject filter can be used as elements of the band reject filter. For example, these discrete elements can be L,C elements, for instance.

An exemplary design of a band reject filter in the ladder-type arrangement is known from the publication by S. Beaudin, C.-Y. Jian, and D. Sychaleun titled "A New SAW Band Reject Filter and its Applications in Wireless Systems," 2002 IEEE Ultrasonics Symposium Munich, pages 143-147. Full reference is made here to this publication in terms of content.

The embodiments are not limited to a single first or second signal path. Multiple transmission ranges can be implemented in the first signal path, wherein a second signal path with a corresponding band reject filter is provided for at least one transmission range. However, it is also possible to form for each transmission range an individual second signal path with a band reject filter whose cut-off region at least partially overlaps with the respective transmission range.

For example, a circuit can have multiple first signal paths, wherein a band pass filter for n≧1 transmission ranges is realized in at least one first signal path and, accordingly, a second signal path is provided with corresponding number of band reject filters. The transmission range overlaps, at least partly, with the cut-off region assigned to it.

DETAILED DESCRIPTION

Figure 1:
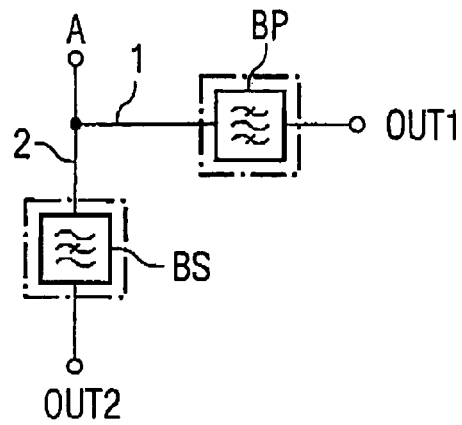
FIG. 1 shows a circuit with band pass and band reject filters implemented in separate components.

FIG. 1 shows a circuit with an antenna connection A, a first signal path 1 and a second signal path 2. The first signal path 1 is provided with an external connection OUT1. The second signal path 2 has is provided with an external connection OUT2. A band pass filter BP designed as a band pass filter is in the first signal path 1. The band pass filter can be implemented in ladder-type or DMS arrangement.

To reduce the insertion loss of the wanted signal rerouted to the first signal path 1, especially a GPS, Bluetooth and/or WLAN signal, a band reject filter, which can be a resonator, is in the signal path 2, wherein the cut-off region of the second signal path and the transmission range of the first signal path can overlap.

In one embodiment, the band pass filter BP and the band reject filter BS are both implemented in a chip and can be mounted on a printed circuit board. Each chip can be a component provided with a package. However, the band reject filter can also be implemented on the printed circuit board from individual elements and electrically connected with a band pass filter also mounted on the printed circuit board as a compact component with or without a package.

The integration of the circuit components into or onto a common component or a common chip with external contacts is indicated in the figures by dotted lines. The circuit components directly abutting one another in the block diagram can be implemented on a common chip.

Figure 2:
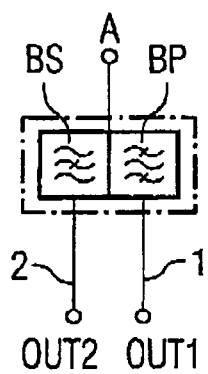
FIG. 2 shows a circuit with band pass and band reject filters implemented in a common chip.

FIG. 2 shows another implementation. The band pass filter BP and the band reject filter BS are integrated into a common chip, wherein the elements of the band pass filter and the band reject filter can be designed as conductor paths in the metallization levels of a multi-layered substrate.

Figure 3:
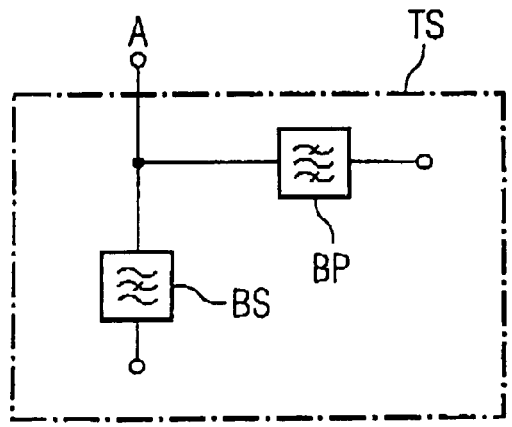
FIG. 3 shows a circuit implemented in a modular component with band pass and band reject filters, each implemented as a chip.

FIG. 3 shows a circuit in a modular design. The band pass filter BP and band reject filter BS (which can be implemented as separate chips) are mounted on a carrier substrate TS. The carrier substrate can have one or more dielectric layers, for example, layers of LTCC (Low Temperature Cofired Ceramics). A metallization layer is between two dielectric layers. In the metallization layer, additional circuits, for example, a matching network, can be implemented by conductor paths. Through-connections electrically connect different metallization layers with one another, with the chips and with external contacts of the module (not shown in FIG. 3) or of the carrier substrate.

Figure 4:
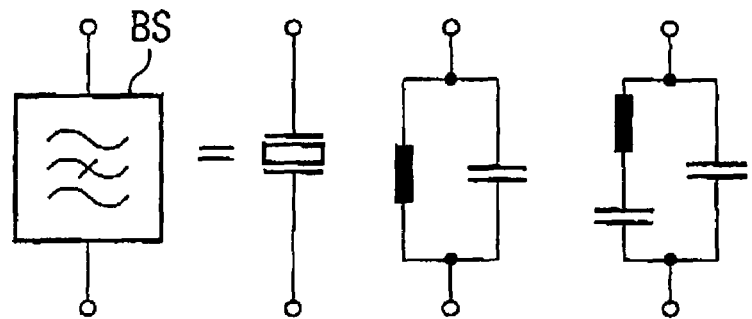
FIG. 4 shows various variants of a band reject filter to be used in a circuit.

FIG. 4 shows various embodiments of a band reject filter BS. The band reject filter can be designed as a parallel resonance circuit or, more generally, as a resonator (for example, a thin-film resonator operating with acoustic volume waves), or as an electroacoustic transducer. A pole (antiresonance) of the resonator produces the band reject filter at the desired resonance frequency. In this case, the corresponding cut-off region in the second signal path is narrower than the transmission range of the first signal path assigned to this second signal path.

It is also possible to implement the band reject filter as a conventional band reject filter circuit, with a blocked bandwidth (i.e. the bandwidth of the cut-off region) equal to or larger than the bandwidth of the band pass of the corresponding band pass filter.

Figure 5A:
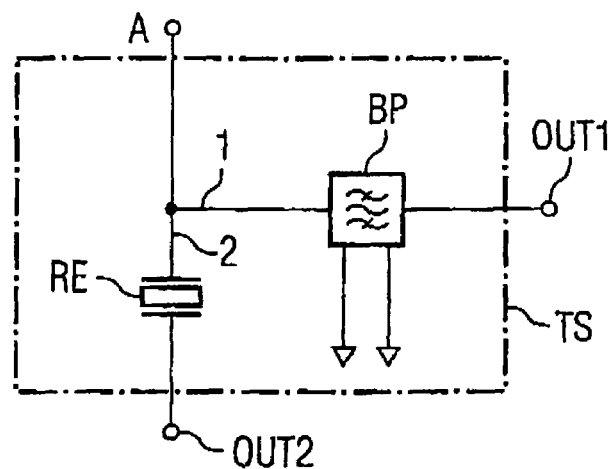
FIG. 5a shows a circuit with a band reject filter as a resonator.
Figure 5B:
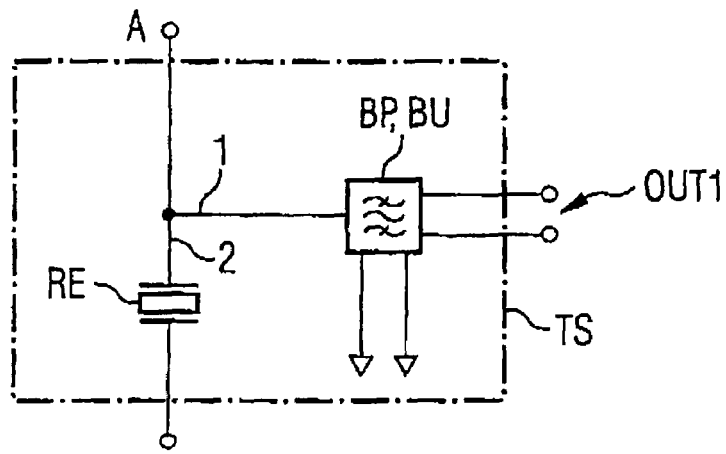
FIG. 5b shows a circuit wherein the band pass filter in the first branch is a balun.

FIGS. 5a and 5b both show a modular component wherein the band reject filter is a resonator RE. The first signal path 1 shown in FIG. 5a can guide an unbalanced high-frequency signal, and the first signal path shown in FIG. 5b can guide a balanced high-frequency signal. In FIG. 5b, the band pass filter BP is a balun BU. It is also possible to connect a balun implemented as a separate component or circuit, or a balun integrated into the carrier substrate TS, to the output of the band pass filter.

Figure 6A:
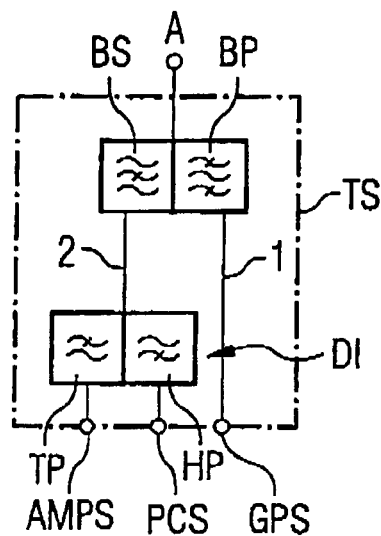
FIGS. 6a through 6d show circuits with a diplexer in the second branch connected to the output of the band reject filter.

FIG. 6a shows a circuit with diplexer DI connected downstream to the second signal path 2 of the band reject filter BS. The diplexer DI comprises a low pass filter TP and a high pass filter HP. The diplexer can separate the signals of two wireless systems, in this case, AMPS and PCS. The send and receive signals of a wireless system, for example AMPS, can be rerouted with a duplexer (not shown in FIG. 6a) in the corresponding send or receive path. The first signal path 1 can be used to transmit GPS data. This circuit can be completely implemented in a modular component. At the same time, the band pass filter BP and the band reject filter BS can be implemented in or on a common chip. The high and low pass filters HP and TP of the diplexer DI are also implemented in or on a common chip. Both chips are mounted on a carrier substrate TS.

Figure 6B:
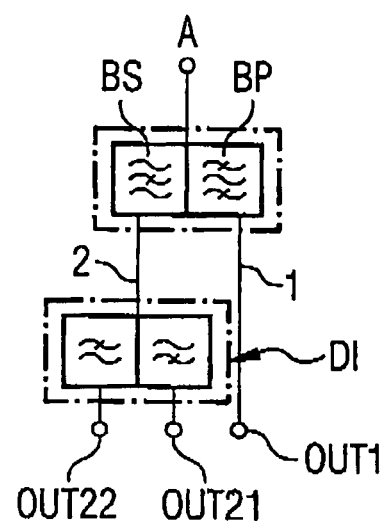

As shown in FIG. 6b, the chip comprising the band pass filter BP and the band reject filter BS and the chip comprising the diplexer DI can be separate components mounted on a printed circuit board independently of one another and connected electrically with one another. The Diplexer DI can also be completely implemented in a multi-layered substrate or in the interior of a substrate.

Figure 6C:
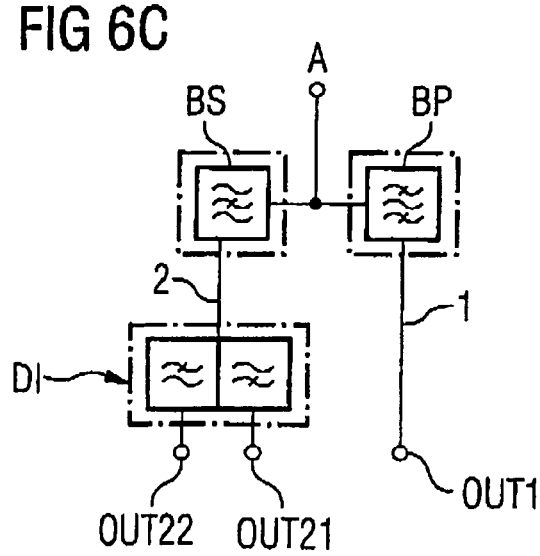

In FIG. 6c, each of the band reject filter BS and the band pass filter BP is implemented in a separate chip. These chips are mounted on a printed circuit board independently of one another and connected electrically with one another and with an antenna by conductor paths provided on the printed circuit board. The band reject filter BS and the band pass filter BP can be implemented in different technologies, wherein the band pass filter can be a component operating with acoustic surface waves, and the band reject filter can be a component operating with acoustic volume waves.

Figure 6D:
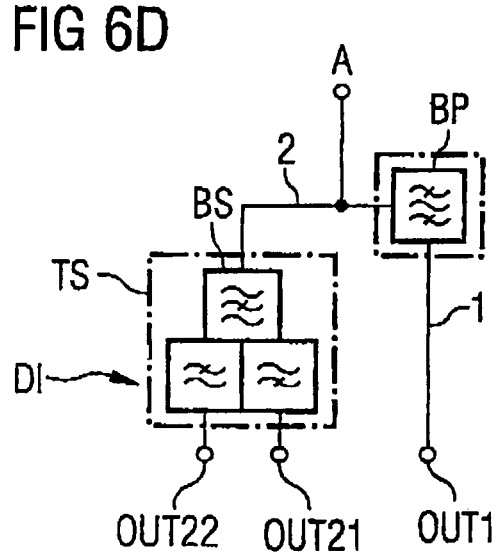

In FIG. 6d, the band pass filter BP is implemented as a chip. The band reject filter BS is located together with a diplexer DI on a common carrier substrate TS, wherein the diplexer DI can also be integrated into the substrate interior.

Specifically, the diplexer DI separates the signals to be transmitted at a first frequency $f_1$ (for example 1 GHz, AMPS) from signals at a second frequency $f_2$ (for example 2 GHz, PCS). In another embodiment, an additional wanted signal to be transmitted at a third frequency $f_3$ (for example 1.5 GHz, GPS) can be rerouted—in contrast to FIG. 6—from a path connected to the output of the diplexer connected to the antenna path.

FIGS. 7a through 7d each show a circuit with a diplexer DI connected to the input of the extractor filter.

Figure 7A:
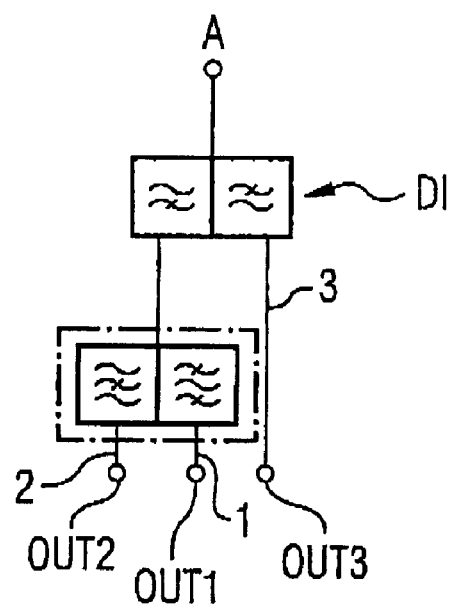
FIGS. 7a through 7d show circuits with a diplexer to the input of the band pass filter and the band reject filter.
Figure 7B:
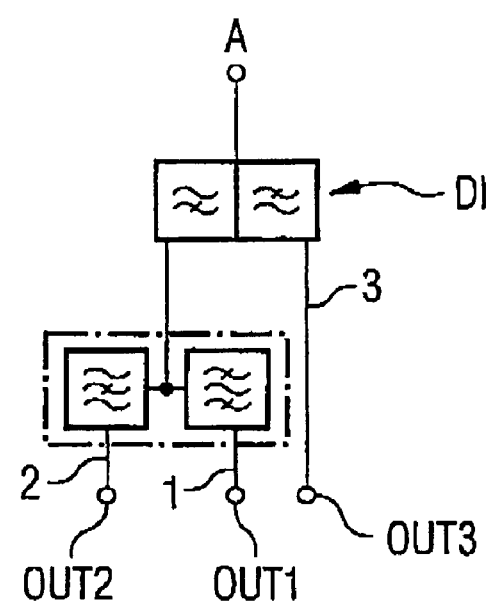
Figure 7C:
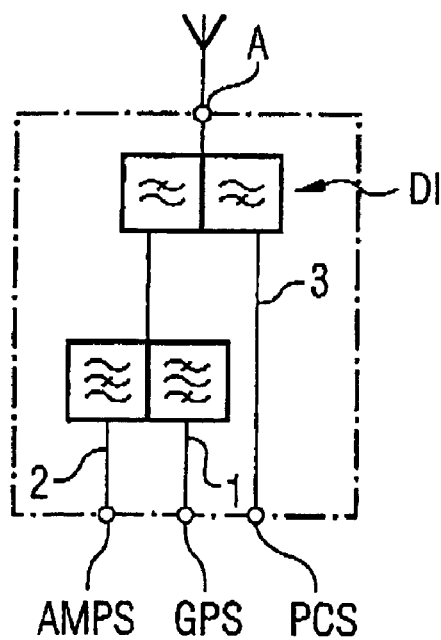
Figure 7D:
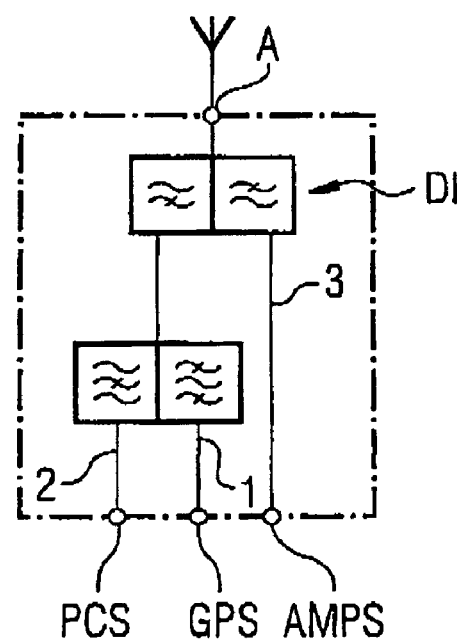

In FIGS. 7a, 7b and 7d, the signal assigned to the lower frequency $f_1$ is rerouted to the signal path 3 and directed to the external connection OUT3 for further signal processing. In this case, the signal path 2 can transmit the signal assigned to the higher frequency $f_2$. The signal path 1 can transmit the signal at the third frequency $f_3$, which is higher than $f_1$. In this embodiment, the diplexer DI redirects at a frequency f, which is between $f_1$ and $f_3$ when $f_3 < f_2$, and between $f_1$ and $f_2$ when $f_2 < f_3$. This circuit can generally be implemented under the following conditions:

$$f_1 < f_2, f_3, \quad\quad\quad 1)$$

$$f_1 < f < f_2, f_3. \quad\quad\quad 2)$$

The embodiment shown in FIG. 7b is suitable if $f_1$, $f_3 < f_2$ and $f_1$, $f_3 < f < f_2$. In another embodiment shown in FIG. 7b, the diplexer DI redirects at a frequency f, which is between $f_3$ and $f_2$, if $f_1 < f_3$. When $f_3 < f_1$, the diplexer switches between $f_1$ and $f_3$. The signal transmitted at higher frequency, i.e. the signal to be transmitted at $f_2$ (PCS), is rerouted through the high pass filter to the signal path 3. The lower frequency signals to be transmitted at $f_1$ (AMPS) and $f_3$ (GPS) pass first in a common path and are then separated from one another by the extractor filter.

In FIG. 7a the band reject filter and the band pass filter, i.e., the complete extractor filter, are implemented in a common component. The common component can be a package. In FIG. 7b, the extractor filter has components, each provided with a package, and independent of each other. FIGS. 7c and 7d both show a front-end circuit that can be a modular component.

A modular component can also comprise other front-end circuits, for example matching networks or antenna switches with active components. It is also possible to integrate low-noise amplifiers, power amplifiers, mixers, oscillators, etc., in a single module.

A matching network can comprise, for example, at least one of inductors, capacitors, a transmission line or a combination of any number of these elements. A matching network can be implemented at the antenna side, i.e., it can be connected to the input of the extractor filter. However, a matching network can also be connected to the output of the extractor filter.

The band reject filter can be replaced by a group of components directly attached to the antenna. In other embodiments, this group of components can be connected to the output of the band reject filter. In the present embodiment, this group of components, together with a matching network or component located on the antenna side implements a virtual band reject filter element. The matching network or component can match the impedance of the band pass filter. In this case, the band reject filter element, whose transmission characteristic has a pole, can be omitted. The component can be, for example, at least one of a diplexer, a duplexer, or a switching module with at least one antenna switch.

Figure 8:
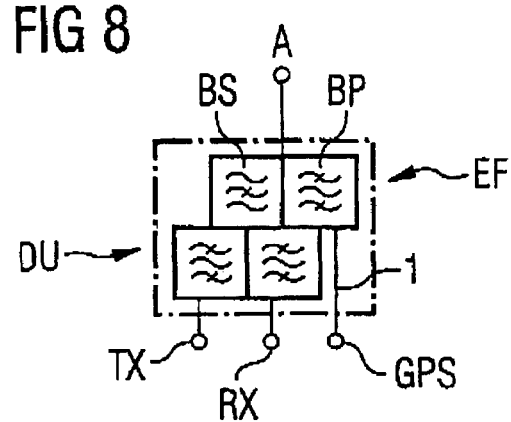
FIG. 8 shows a circuit with a duplexer in the second branch connected to the output of the band reject filter.

FIG. 8 shows another circuit wherein the extractor filter EF is attached directly to an antenna connection. In the second signal path, a duplexer that separates the send and receive signals of a wireless system from one another is connected to the output of the band reject filter BS. The duplexer reroutes these signals into a send path TX and a receive path RX. With an intentional band rejection in the second signal path, the unwanted signals generated in the second signal path that lie in the frequency range of the GPS signal can be suppressed on the antenna side.

Figure 9:
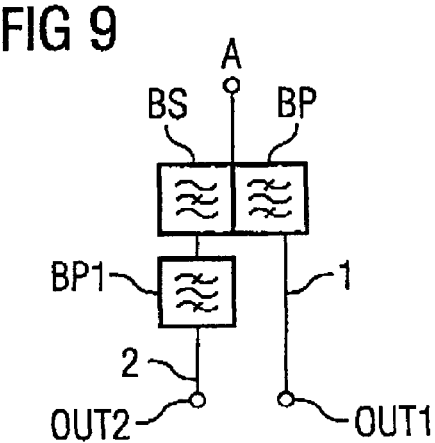
FIG. 9 shows a circuit with an additional band pass filter in the second branch connected to the output of the band reject filter.

In the embodiment shown in FIG. 9, an additional band pass filter, BP1, in the second signal path 2 is connected to the output of the band reject filter BS; the transmission range of the filter BP1 does not overlap with the cut-off region of the band reject filter BS. The band pass filter BP and the additional band pass filter BP1 together can form a duplexer. In this case, a frequency band or at least one frequency point can be intentionally extracted from the signal path 2 of this duplexer (i.e. the frequency band or point can be suppressed in the signal path 2). The frequency to be suppressed in the signal path 2 can be, for example, a frequency of another wireless system or a harmonic of an oscillator in a transmit path of the duplexer.

The circuit shown in FIG. 9 can be a single component or be multiple independent chips.

Figure 10:
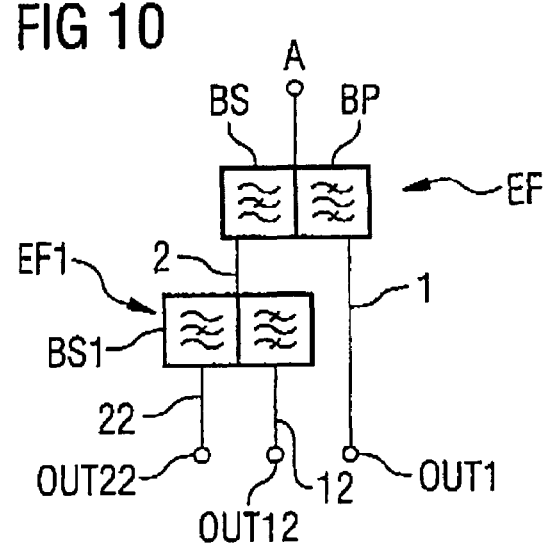
FIG. 10 shows a cascaded circuit.

In FIG. 10, an extractor filter EF attached to an antenna can be cascaded with at least one additional extractor filter EF1.

The additional extractor filter EFI is arranged in the second signal path 2 of the first extractor filter EF. The signal path 1 is used to transmit a first wanted signal, for example, the GPS signal. The first signal path 12 of the additional extractor filter EF1, which is provided with the connection OUT12, can transmit a second wanted signal, for example, to transmit WLAN data. The unwanted signals associated with each wanted signal are each time suppressed by the corresponding stage of the extractor filter cascade, so that two different cut-off regions result in the second signal path 22 of the additional extractor filter, wherein in this path at least the frequency of the first and second wanted signals is suppressed.

In addition, a multi-stage cascade of N extractor filters connected in series can be implemented, wherein the signals input into the second signal path on the antenna side are suppressed by the Nth stage in N different frequency bands.

Figure 11:
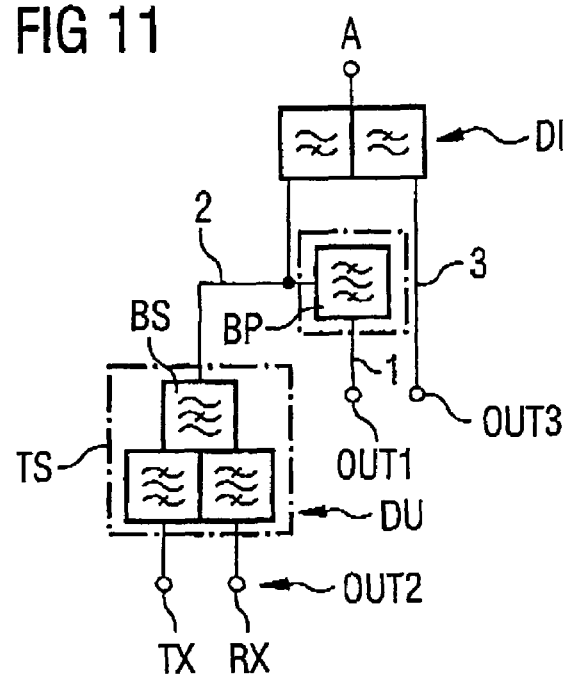
FIG. 11 shows a circuit with a diplexer connected to the input of the band pass filter and to the input of the band reject filter, and a duplexer in the second branch connected to the output of the band reject filter.

FIG. 11 shows another embodiment wherein the extractor filter is connected to the output of the diplexer DI and to the input of the duplexer DU located in the second signal path 2 of the extractor filter. In this embodiment, the band reject filter BS and the duplexer DU together are both integrated here on a common carrier substrate. In this case, the band pass filter BP can be an independent, discrete, component.

In this embodiment, the signal to be rerouted into the first signal path 1 is extracted not directly at the antenna, but is in a path between the diplexer DI and the duplexer DU.

An extractor filter can be connected to the output of a diplexer, duplexer or antenna switch. Conversely, a diplexer, duplexer or an antenna switch can be connected to the output of the extractor filter, wherein the diplexer, duplexer or antenna switch can be located in the second signal path of the extractor filter.

Figure 12A:
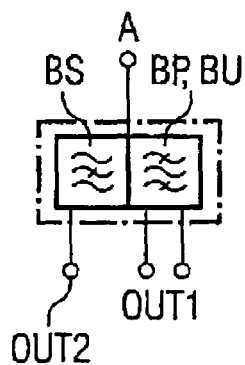
FIGS. 12a, 12b and 12c show a circuit wherein a balun is in the first branch.
Figure 12B:
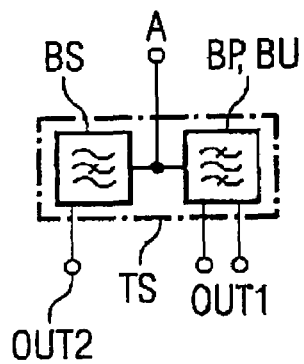
Figure 12C:
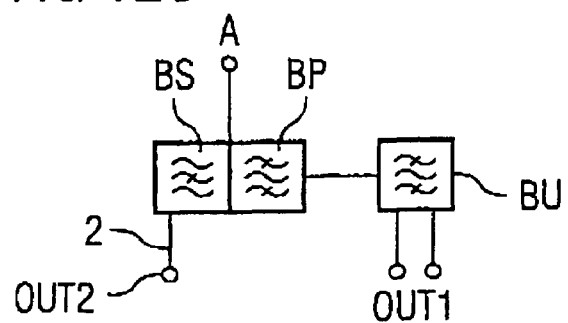

In FIGS. 12a, 12b and 12c, an unbalanced wanted signal can also be directed to a circuit comprising an extractor filter or to a component in which such a circuit is implemented. The OUT connection of the first signal path 1 is a balanced port. As indicated in FIGS. 12a and 12b, the band pass filter BP can be balun BU.

In FIG. 12a, the band pass filter having an unbalanced and a balanced port and the band reject filter having two unbalanced ports are implemented on a common chip.

In FIG. 12b, the band pass filter having an unbalanced port and a balanced port and the band reject filter having two unbalanced ports are each implemented on an individual chip, wherein both chips are mounted on a common carrier substrate TS or on a printed circuit board of the end device.

In FIG. 12c, the extractor filter implemented as one chip and a balun implemented as an additional chip are mounted on a common carrier substrate or on a printed circuit board of the end device.

An extractor filter can be resonators operating with acoustic surface or volume waves, MEMS elements (MEMS=Micro Electro-Mechanical System), MWC filters (MWC=Micro Wave Ceramics) or other electroacoustic structures not named here. It is possible to implement the complete extractor filter in only one technology. However, it is also possible to combine any components manufactured in various technologies with, for example, any components available as discrete components.

Every chip in or on which a complete extractor filter can be implemented can comprise at least one of a SAW resonator or a BAW resonator or L,C elements (SAW=Surface Acoustic Wave; BAW=Bulk Acoustic Wave). The components of the extractor filter located on the antenna side can comprise, for example, BAW resonators. The components of the extractor filter located on the output side can comprise, for example, SAW resonators. Moreover, with the output-side components of the extractor filter, a balun can be implemented.

In addition, an extractor filter comprising individual elements, for example, inductors, capacitors, transmission lines, cavity resonators or any combination of these, can be implemented. These in turn can be combined with any of the aforementioned electroacoustic and electromechanical components.

It is also possible to implement only a part of the circuit in or on one or more chips and to integrate the remaining—for example the passive-circuit components into a common substrate or to mount them separately on a printed circuit board.

The band reject filter of the extractor filter can be integrated independently of the band pass filter into a stage to be connected to the input or output of the extractor filter or into a component (for example, duplexers, diplexers, filters) to be connected to the input or output of the extractor filter. The band pass filter of the extractor filter can also be integrated independently of the band reject filter into a stage to be connected to the input or the output of the band pass filters or into a component to be connected to the input or output of the extractor filter.

Integration means integrates, into or onto a carrier substrate, or locates various elements in a common package that can be electrically connected with a printed circuit board.

The band pass filter in the first signal path can withstand the transmitting power corresponding to the send frequency of the first wanted signal. The band pass filter can have a first part exposed to the transmitting power and a second part which is not exposed to the transmitting power. In one embodiment, the band reject filter and the first part of the band pass filter are integrated together on a common chip. The second part of the band pass filter can be implemented on the same chip or on a separate one.

The band reject filter can be a discrete component or can be implemented using various individual elements on a printed circuit board.

Oscillators with multiple poles or band reject filters with more than one cut-off region can be used as band reject filter elements.

Other embodiments are possible. For example, the circuit can be an additional switchable modular component with external connections (including an antenna connection), wherein a connection is designed for a first wanted signal (GPS, WLAN, Bluetooth) and other connections are designed for other signals. The other signals could be, for example, the signals of a multiband wireless system that are separated from one another in the component according to frequency band, wherein the first wanted signal is extracted from the wireless signal paths.

The invention claimed is:

1. A circuit comprising:
 a first signal path comprising a band pass filter having a transmission range;
 a second signal path comprising a band reject filter having cut-off region; and
 an antenna connection that is connected to the circuit directly or via another circuit;
 wherein the first and second signal paths are parallel and are interconnected at a point between the antenna connection and the band pass filter and band reject filter; and
 wherein the transmission range overlaps the cut-off region at least in part, and
 wherein the first and the second signal paths are always available to transmit data.

2. The circuit of claim 1, wherein the band pass filter comprises a component operating with acoustic surface waves.

3. The circuit of claim 1 wherein the band reject filter comprises a resonator or an electroacoustic transducer.

4. The circuit of claim 1, wherein the band reject filter comprises at least one of a band reject filter chip, a chip comprising a trap circuit, and a chip comprising at least one resonator.

5. The circuit of claim 1, wherein the band reject filter comprises a band reject filter circuit or a trap circuit, and wherein the band reject filter comprises a plurality of discrete components.

6. The circuit of claim 1, wherein the band pass filter and the band reject filter comprise parts of a common chip; or
wherein the band pass filter and the band reject filter each comprise a chip, each chip being located on a common carrier substrate.

7. The circuit of claim 1, wherein the first and second signal paths comprise parts of a single common component.

8. The circuit of claim 1, further comprising:
at least one of an additional band pass filter, a diplexer, and a duplexer located in the second signal path, wherein the band reject filter is between the antenna connection and at least one of the additional band pass filter, the diplexer, and the duplexer.

9. The circuit of claim 1, further comprising:
a diplexer located at a point between the antenna connection and the band pass filter and band reject filter.

10. The circuit of claim 9, wherein the diplexer, the first signal path, and the second signal path comprise parts of a common component.

11. The circuit of claim 1, further comprising:
a duplexer in the second signal path; wherein the band reject filter is between the antenna connection and the duplexer; and
wherein the band reject filter and the duplexer comprise parts of a common component.

12. The circuit of claim 11, wherein the band pass filter, the band reject filter, and the duplexer comprise parts of a common component.

13. The circuit of claim 1, wherein the first signal path comprises a balanced output terminal.

14. The circuit of claim 1, wherein the band pass filter comprises a balun.

15. The circuit of claim 1, wherein the transmission range and the cut-off region are in a substantially same frequency range.

16. The circuit of claim 1, wherein the transmission range is broader than the cut-off region; and
wherein at least a part of the cut-off region is arranged in the transmission range.

17. The circuit of claim 1, wherein the transmission range is narrower than the cut-off region; and
wherein at least a part of the transmission range is in the cut-off region.

18. A component comprising:
the circuit of claim 1;
an antenna input terminal interfaced to the antenna connection;
at least one output terminal assigned to the second signal path; and
at least one output terminal assigned to the first signal path.

19. The component of claim 18, wherein the band pass filter and the band reject filter are implemented using different technologies.

20. The component of claim 18, wherein at least one of the band pass filter and the band reject filter comprise at least one resonator or transducer that operates with acoustic waves.

21. The component according to claim 18, which is implemented in at least one of SAW and BAW technology.

22. The circuit of claim 1, wherein the second signal path comprises a send/receive path.

23. The circuit of claim 1, wherein the first signal path is for transmitting GPS data.

24. A circuit comprising:
a first signal path comprising a band pass filter having a transmission range;
a second signal path comprising a band reject filter having cut-off region; and
an antenna connection that is connected to the circuit directly or via another circuit;
wherein the first and second signal paths are parallel and are interconnected at a point between the antenna connection and the band pass filter and band reject filter;
wherein the transmission range overlaps the cut-off region at least in part;
wherein the band reject filter comprises a band reject filter circuit or a trap circuit;
wherein the band reject filter comprises a plurality of discrete components; and
wherein the band reject filter comprises at least one of a band reject filter chip, a chip comprising a trap circuit, and a chip comprising at least one resonator, and
wherein the first and the second signal paths are always available to transmit data.

* * * * *

UNITED STATES PATENT AND TRADEMARK OFFICE
CERTIFICATE OF CORRECTION

PATENT NO.       : 7,583,936 B2
APPLICATION NO.  : 10/570364
DATED            : September 1, 2009
INVENTOR(S)      : Gunter Kovacs et al.

It is certified that error appears in the above-identified patent and that said Letters Patent is hereby corrected as shown below:

On the Title Pg, item (54), delete "CIRCUIT WITH REDUCED INSERTION LOSS AND COMPONENT COMPRISING ONE SUCH CIRCUIT" AND INSERT -- CIRCUIT WITH REDUCED INSERTION LOSS --.

On the Title Pg, item (56), U.S. PATENT DOCUMENTS, add -- 6,127,962 10/2000 Martinson 342/20 --.

Col. 1, line 1-3, delete "CIRCUIT WITH REDUCED INSERTION LOSS AND COMPONENT COMPRISING ONE SUCH CIRCUIT" AND INSERT -- CIRCUIT WITH REDUCED INSERTION LOSS --.

Signed and Sealed this

Seventeenth Day of November, 2009

David J. Kappos
*Director of the United States Patent and Trademark Office*